United States Patent [19]

Stall

[11] Patent Number: 5,279,401
[45] Date of Patent: Jan. 18, 1994

[54] METHOD FOR CONTROLLING FRICTION CLUTCHES OR BRAKES

[75] Inventor: Eugen Stall, Neunkirchen, Fed. Rep. of Germany

[73] Assignee: Uni-Cardan AG, Siegburg, Fed. Rep. of Germany

[21] Appl. No.: 902,765

[22] Filed: Jun. 23, 1992

Related U.S. Application Data

[63] Continuation of Ser. No. 630,501, Dec. 20, 1990, abandoned, which is a continuation-in-part of Ser. No. 433,684, Nov. 8, 1989, abandoned.

[30] Foreign Application Priority Data

Nov. 8, 1988 [DE] Fed. Rep. of Germany ....... 3837861

[51] Int. Cl.$^5$ ................................................. F16H 1/44
[52] U.S. Cl. ................................ 192/52; 192/84 R; 475/231
[58] Field of Search ..................... 192/52, 84 R, 85 R; 475/231; 74/325

[56] References Cited

U.S. PATENT DOCUMENTS

| | | | |
|---|---|---|---|
| 2,660,266 | 11/1953 | Maloney | 188/181 A |
| 2,753,017 | 7/1956 | Curl | 188/181 A |
| 3,637,264 | 1/1972 | Leiber et al. | 188/181 A |
| 3,682,514 | 8/1972 | Oberthür | 303/61 |
| 3,929,380 | 12/1975 | Leiber | 303/61 |
| 4,018,486 | 4/1977 | Sutton | 188/181 A |
| 4,109,970 | 8/1978 | Ashby, Jr. | 303/61 |
| 4,445,400 | 5/1984 | Sullivan et al. | 192/52 |
| 4,480,877 | 11/1984 | Resch | 188/181 A |
| 4,679,463 | 7/1987 | Ozaki et al. | 475/86 |
| 4,950,214 | 7/1990 | Botterill | 475/231 |
| 5,080,640 | 1/1992 | Botterill | 475/231 |

FOREIGN PATENT DOCUMENTS

| | | |
|---|---|---|
| 828940 | 1/1952 | Fed. Rep. of Germany . |
| 2416215 | 1/1978 | Fed. Rep. of Germany . |
| 3102109 | 9/1982 | Fed. Rep. of Germany . |
| 3621348 | 1/1988 | Fed. Rep. of Germany . |

*Primary Examiner*—Rodney H. Bonck
*Attorney, Agent, or Firm*—Harness, Dickey & Pierce

[57] ABSTRACT

Apparatus with a force- or moment-generating actuating member, operating electromagnetically or electromotively and a mechanical transmission arrangement, rotating of sliding, working on an actuation arrangement of a friction clutch or brake, characterized by a drive or control arrangement which excites a pulsating force or a pulsating moment on the mechanical transmission arrangement member.

6 Claims, 4 Drawing Sheets

METHOD FOR CONTROLLING FRICTION CLUTCHES OR BRAKES

This is a continuation of U.S. patent application Ser. No. 630,501, filed Dec. 20, 1990, now abandoned, which is a continuation in part of Ser. No. 433,684, filed Nov. 8, 1989, and now abandoned.

DESCRIPTION

The invention is directed to a method for controlling friction clutches or -brakes in lockable differentials or power shift transmissions by means of an actuator acting upon the friction elements. Moreover the invention is directed to preferred apparatus for performing such a method.

The actuated arrangement herein is a clutch or a brake while the actuator is defined as the unit generating the force or the moment. A gearbox or a linkage or possibly a direct mechanical connection can be provided as a transfer arrangement in between the above units.

Devices for mechanical force- or moment transmittal from an actuator through a transfer arrangement to a friction clutch or -brake must often be designed with as little friction as possible, wherein the friction in the actuator is just as important as the friction in the transfer arrangement. A reason for the desired low friction in the actuator is the possible selection of small actuators and a low energy consumption. Another reason is the desire for a linear behavior of the device in order to improve its control capability.

The frictional effects in a force or moment transfer arrangement produce hysteresis, which is disadvantageous with respect to the dynamic control. Arising from this a method as introduced above makes possible an improved control which approaches linearity without having the reduce the inherent frictional forces. The solution herein involves imposing an alternating load upon the force or the moment exerted by the actuator for reducing the frictional forces in the transfer arrangement. The effect of the invention is that of eliminating or reducing the frictional forces during the application of changing forces or moments.

According to a first embodiment the alternating load can occur at a specific frequency and in a specific pulse-interval ratio through modulation of the electromotive or electromagnetic, actuator generating the force. A second possibility is seen in connecting an independent pulse generating member at a suitable point within the transfer arrangement or the actuator, wherein its drive or control functions occur as stated above, but where the nature of the force generation must not follow the same principle as in the actuator.

Applications of the method in the invention are feasible in different types of transfer arrangement design. The method provided can in certain applications, especially in highly geared transmission arrangements also diminish unwanted lagging of the clutch or the brake.

A first preferred embodiment of the method in the invention are differentials with an externally controllable degree of lock or slip, wherein the degree of locking can be adjusted by a disc clutch. A second preferred embodiment for the method in the invention is a gearshift transmission where, without interrupting the traction force, gear wheels together with their shafts can be locked or released by means of friction clutches instead of synchronization arrangements and claw clutches.

Since relatively high forces are required for actuating disc clutches, which are to be operated by comparatively small electromagnetic or electromotive, actuators having a low power output, a transmission arrangement with a high step-up ratio is required. Appropriate mechanical arrangements usually have frictional losses which manifest themselves in marked hysteresis effects. The interfering frictional influences can be reduced by pulsating the actuator and thus the actuation behavior overall can be improved.

A transmission arrangement adapted, hereto can for instance comprise a rotatable adjuster ring with control cams on its end faces, acting upon an axially displaceable pressure ring moving the friction discs. By means of pulse-width modulation of an eletric motor which provides the actuating means, frictional forces which create the disturbances in continuous controlled changes in differential locking torque are suppressed such that on exact adjustment is possible.

Preferred arrangements for applying the method in the invention are depicted in the drawings.

Figure 1:
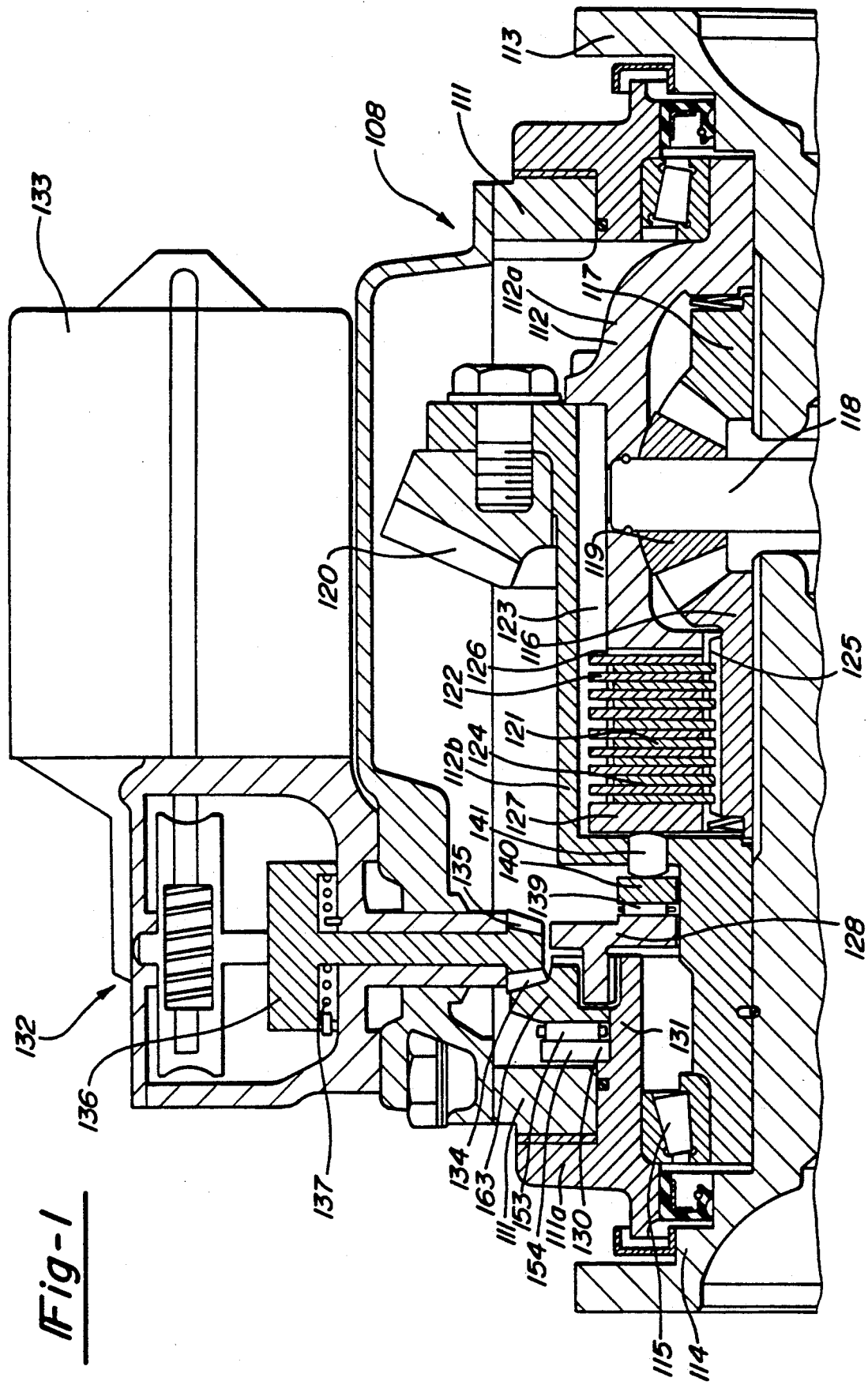
FIG. 1 shows an externally controllable lockable differential in a first embodiment in longitudinal section.

The lockable differential bevel gear drive 108 includes a differential cage 112 is rotatably arranged in a bearing 115 supported in a bearing support 111a connected with a housing 111, as depicted in FIG. 1. The differential cage 112 is designed so as to be divided and comprises a first part 112a receiving the first output bevel gear 117 and the second output bevel gear 116; said output bevel gears mesh with differential bevel gears 119 rotatably supported on the carrier 118 designed as a pin arranged in a part 112a of the differential cage 112 so as to rotate together with said differential cage. The second part 112b of the differential cage 112 is connected with the first part 112a so as to rotate together with same. It serves for receiving a friction arrangement 121. Furthermore, a ring gear 120 is mounted on a flange surface of the differential cage 112b, through which the differential cage 112 can be driven by the engine of the vehicle. The output bevel gears 116, 117 comprises bores sets of teeth, into which, for examples half shaft connectors 113, 114 are placed which serve as connectors for the drive shafts of the rear road wheels. It is however also conceivable that the joints belonging to the drive shafts are equipped with appropriate trunnions which can be slid directly into the bors of the output bevel gear wheels 116, 117. The two output bevel gears 116, 117 are located in the differential cage 112 so as to be respectively rotatable. Furthermore, a friction assembly 121 is provided comprising outer discs 122 and inner discs 124. The inner discs 124 have sets of teeth in their bores, by means of which they are received on a matching external set of teeth 125 of an extension of the output bevel gear 116 so as to fixedly rotate together but to be displaceable thereon. The outer discs 122 arranged respectively between two inner discs 124 have also teeth on their outer circumference which engage into corresponding grooves or sets of teeth 123 which are arranged in the differential cage 112 or its second part 112b so as to fixedly rotate together. The outer discs 122 are also displaceable in axial direction. The friction assembly 121 abuts on the one side axially on a support face 126 which is a component of the first part 112a of the differential cage 112 and on the other side by a thrust plate 127 to which pressure can be applied to the frictional arrangement 121. Thrust pins 141 protruding through the second part 112b of the differential cage 112 are provided against which rests a pressure disc 140 arranged outside of the differential cage 112. The differential cage 112b is provided with a radially oriented face in the area of the thrust pins 141.

The action of the frictional arrangement 121 for braking the output bevel gear 116 with respect to the differential cage 112 is described in the following. An actuating ring 128 is arranged in the bearing area 111a of the housing 111 so as to be fixedly connected for ratation with but axially displaceable upon a bearing carrier extention 131.

The bearing carrier extension 131 is provided with a set of splines 130 for this purpose on which the actuating ring 128 is guided by corresponding splines 130 arranged in a bore of its extension. This ensures non-rotation of the actuating ring 128, which respect to the carrier 111a of the housing 111 wherein, however, because of the splines 130 an axial displacement in direction of the friction assembly 121 is possible. An axial thrust bearing 139 is installed between a radial face of the actuating ring 128 and the pressure plate 140. This diminishes the friction since the pressure plate 140 revolves together with the differential cage 112. Furthermore, a back-up ring 163 is arranged on the bearing carrier extension 131 so as to be rotatable but axially not displaceable. The back-up ring 163 abuts against an axial bearing comprising the roller members 153 and the back-up rin 154. The back-up ring 163 and the back-up ring 128 have radially extending end regions which lie opposite each other.

The back-up ring 163 is provided with a set of bevel gear teeth 134 in its radially outer segment for obtaining the rotary motion, with a pinion 135 engaging into said bevel gear teeth. The pinion 135 is connected through a free wheeling arrangement 136 with a first step up stage 132 as viewed from the electric motor 133. Furthermore, a return spring 137 is arranged between the housing 111 and the shaft belonging to the pinion 135 which shaft is conducted toward the outside through the housing 111; the return spring 137 is designed as a spiral spring. In reversible step-down gear trains, said spring can also be coupled to the motor shaft. Possibly the return spring can even be eliminated. The control of the motor 133 can occur in known fashion, for instance, by using signals indicating vehicle wheel slippage.

Figure 2:
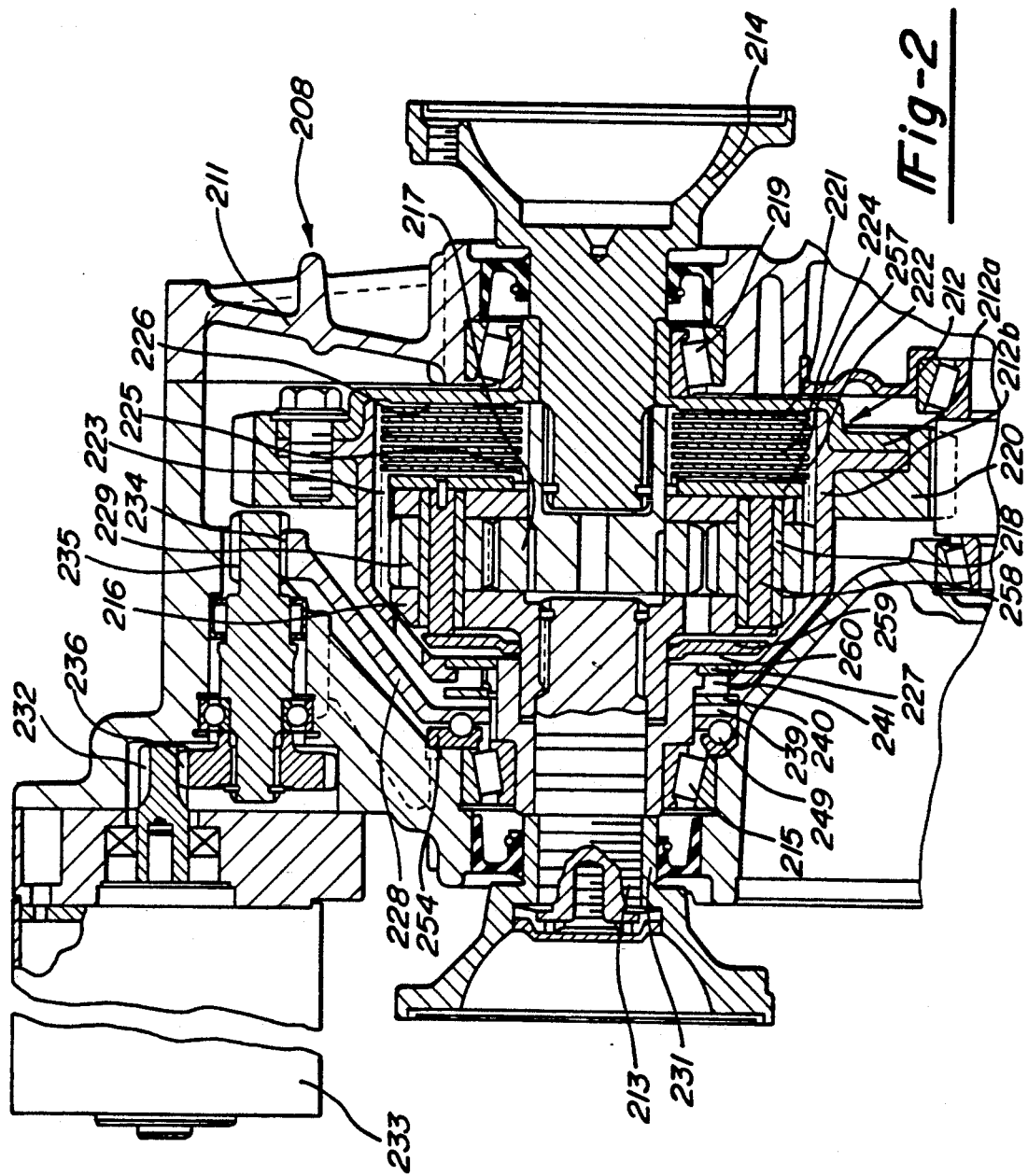
FIG. 2 shows an externally controllable lockable differential in a second embodiment in longitudinal section.

FIG. 2 shows an externally controlled lockable differential gear 208. The differential cage 212 is rotatably mounted in the housing 211 on bearings 215, 219. The differential cage 212 is divided. A planet carrier 216 and an output gear wheel 217 are received as output drive elements in the differential cage 212. Axially parallel differential wheels 229 are rotatably supported on rotary trunnions 218 designed as sleeves arranged in the planet carrier 216. Furthermore, the ring gear 220 is connected to a flanged face of the differential cage 212, through which the differential cage 212 can be driven by the engine of a vehicle. The output drive elements 216, 217 have internal splines, into which connecting half shafts 213, 214 are placed which serve as the connection to the drive shafts. Alternative shaft/flange designs, left or right hand sides, can be seen. The second segment 212b of the differential cage 212 is connected rigidly for rotation with the first segment 212a. The two output drive elements 216, 217 are mounted to be respectively rotatable in the differential cage 212. Furthermore, a friction assembly 221 is provided consisting of outer discs 222 and inner discs 224. The inner discs 224 have sets of teeth in their bores, by which they engage with a corresponding outer set of teeth or splines 225 on an extension of the output drive wheel 217 so as to fixedly rotate with same, however to be displaceable on same. The outer discs 222 respectively arranged between two inner discs 224 have also teeth on their outer circumference, which engage with the corresponding grooves or sets of teeth 223 arranged in the differential cage 212. The outer discs 222 are also displaceable in axial direction. The friction assembly 221 abuts on the one side axially at the support face 226 which is a component of the differential cage 212, on the other side pressure can be applied to the friction assembly 221 by means of a thrust plate 257. Thrust pins 258 located in the rotary planet pins 218 are provided, which can be acted upon by a first pressure disc 259.

A thrust plate 227 abuts on same by means of a first axial bearing 260, said plate is adjustable by means of further thrust pins 241, against which a second pressure plate 240 arranged externally of the differential cage 212 rests. A second axial thrust bearing 239 is installed between a radial face of the actuation ring 228 and the pressure plate 240. This diminishes the friction since the pressure plate 240 revolves together with the differential cage 212.

The actuation of the friction assembly 221 for braking the output drive gear 217 with respect to the differential cage 212 is described in the following. A back-up ring 254 is arranged in the housing 211 to fixedly rotate with said housing and to be axially nondisplaceable with respect to same. An actuation ring 228 is additionally arranged on a bearing support extension 231 so as to be rotatable and axially displaceable thereto. The actuation ring 228 reacts against the back-up ring 254 through ball members 249 which run in ball races. The actuation ring 228 and the back-up ring 254 have side faces mutually extending radially. In the illustrated example, the actuation ring 228 comprises at least three ramped ball grooves disposed circumferentially on its end face facing the back-up ring 254. The back-up ring 254 comprises the same number of romped ball races raked in the opposite direction. In the initial state when there is no axial force acting upon the friction assembly 221, thus with the bevel gear differential 208 operating in the open state, the actuating ring 228 and the back-up ring 254 are in the closest possible position to each other. If the actuating ring 228 is turned, the ball grooves turn relatively to each other and displace the actuating ring 228 in direction of the friction arrangement 221, which leads to a predetermined locking effect and thus the coupling of the motion of the output drive wheel 217 and thus the output drive wheel 216 to the rotational movement of the differential cage 212.

In order to generate the rotational motion the actuating ring 228 is provided with a set of teeth 234 at its radially outer segment into which a pinion 235 engages. The set of teeth 234 is preferably designed as a helical set of teeth, in order to move the actuating ring 228 against the friction assembly 221 during the build-up of the locking force. The pinion 235 is driven via gear 236, by the electric motor 233 through a step down gear 232. In the invention the electric motor is powered by pulsating current or voltage.

Figure 3:
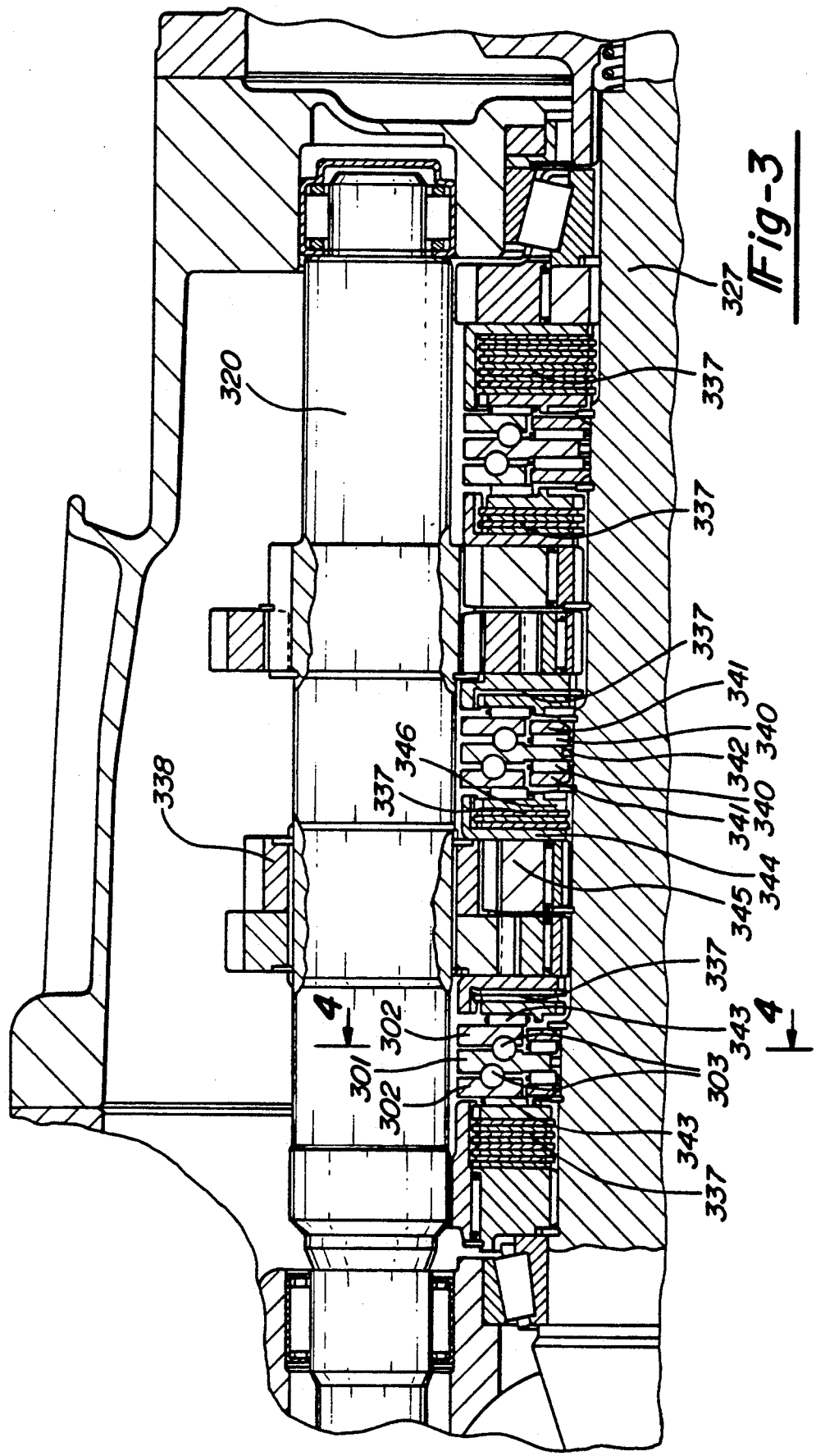
FIG. 3 shows a gearshift transmission which can be shifted without interrupting the traction force in longitudinal section.

FIG. 3 shows a longitudinal section through the two shafts of a gear shift transmission. This transmission comprises five forward speeds and one reversing speed. The shifting mechanisms for each two gearpairs per mechanism in three groups are located between the respective gearpairs, similarly to the synchronizing slide collars in conventional manual shift motor vehicle transmissions. The shifting mechanisms can either be installed on the drive shaft 320 located at the top or as depicted on the output drive or intermediate shaft 327 located at the bottom. The arrangement on the shaft located at the bottom is preferable, since herein the associated friction discs 337 can be easily provided with sufficient lubricating oil. The pinions for the first speed as well as the reversing speed are, as can be discerned, integrated into the drive shaft 320.

Figure 4:
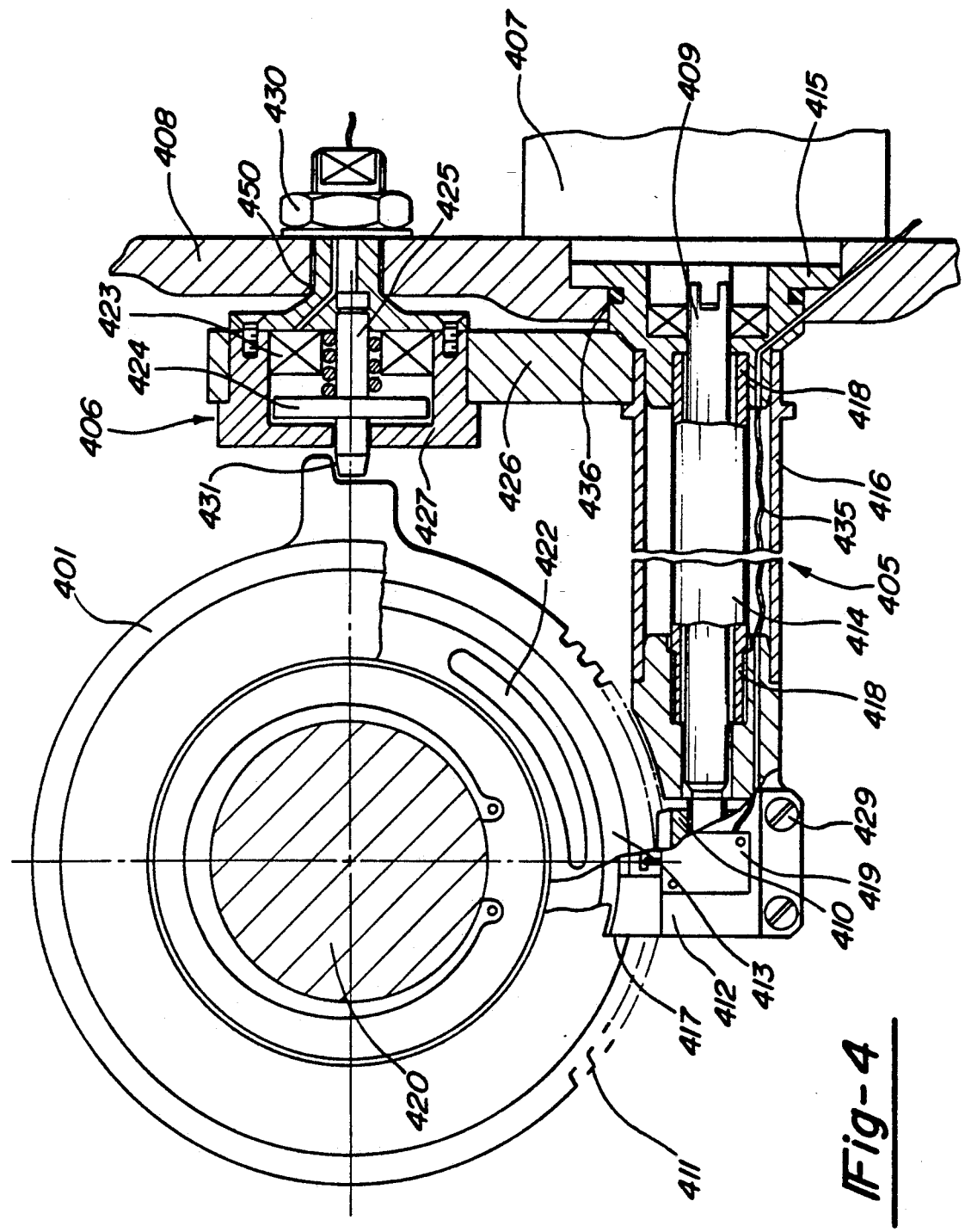
FIG. 4 shows a gearshift transmission in FIG. 3 with an electric motor actuator in cross-section.

FIG. 4 shows a gear shift mechanism for two speeds consisting essentially of a central expander disc 401, 301 rotatable in both directions and axially nondisplaceable, together with two nonrotatable but axially displaceable expansion discs (pressure discs) 402, 302 and with balls 303 guided in between in ramped races not shown.

FIG. 4 shows furthermore the arrangement of the expander disc drive 405 and a possible locking means 406 of the central expander disc, when providing for the reversing gear.

An electric motor 407 installed with its motor flange on the transmission housing wall 408, comprises a spiral gear pinion 410 or a worm gear on its extended drive shaft 409, which is in engagement with a set of teeth 411 on the external circumference of the central expansion disc 401.

The pinion or the worm gear are supported on a pinion housing 412, which is guided in matched grooves 413 of the central expansion disc 401. Security against rotation of the housing 412 relatively to the central expander disc 401, 301 is provided by a connecting tube 414 between the pinion housing 412 and the motor support flange 415. The security against rotation of the two pressure discs 402, 302 is preferably effected directly with respect to the pinion housing, 412. This security is achieved by an appropriate peripheral cut out in each of the pressure discs 402, 302 whose side flanks 417 abut on the housing 412.

The tangential guiding of the pinion housing 412, relative to the transmission housing 408 is achieved by one guide tube 414.

An important aspect can be seen in the actuation of two disc clutches by one single electric motor.

The expander disc 401, 301 is guided on both sides by axial thrust bearings 340, whose abutment discs 341 take up the respective reaction forces of the expansion. Preferably, the rotational guidance of the expansion disc 401, 301 is to be carried by the radial bearing 342. The transmittal of the expanding force from the pressure or thrust disc 402, 302 to a disc pressure ring 346 occurs by an additional axial thrust bearing 343. A friction disc housing 344 is integrated with the respective gear wheel 345 on the countershaft or drive shaft 327 which is permanently in engagement with its gear wheel 338 on the drive shaft 320.

The travel of the balls in the respective groove pairs is controlled in the invention with modulated electric motor current.

Microswitches 419 are attached at one of the housings 412 whose probes slide upon the flanks of the expanding disc 401. The zero or neutral position is indicated by appropriate depressions in the probe travel path at one or both sides of the disc 401, 301.

I claim:

1. A method for controlling frictional members in a limited slip differential or power shift transmission comprising:

providing a limited slip differential with at least two members being rotatable with respect to each other, a plurality of frictional members associated with one of said members respectively for adjusting speed of relative rotation between said members, and actuating means comprising an adjustable electromotive means for actuating said plurality of frictional members;

generating a force by said electromotive means at a desired rate of increased or decreased force;

superimposing a second pulsating force upon the first force exerted by the electromotive means on said frictional members to reduce friction in said actuating means during application of changing forces and substantially reducing friction forces during changing of forces.

2. The method according to claim 1 further comprising modulating said electromotive means in a desired pulse-interval ratio to alternate said force.

3. A limited slip differential comprising:

a housing;

at least two members being rotatable with respect to each other, being held in said housing;

a plurality of friction elements associated with said rotatable members for adjusting speed of relative rotation of said rotatable members;

an actuating member associated with said plurality of friction elements for applying force on said friction elements; and actuating means comprising electromotive means for generating a first force for actuating said actuation member, said electromotive means functioning at a desired frequency such that said actuating member oscillates to provide an increasing or decreasing pulsating force on said frictional elements to reduce friction in said actuating means during application of changing force and said actuating means generating a second force superimposed upon the first force on said frictional members to reduce friction in said actuating means during application of changing forces and substantially reducing friction forces during changing of forces.

4. The apparatus according to claim 3 wherein a pulsating member is coupled with said actuating member, said pulsating force pulsating substantially around a zero value.

5. The apparatus according to claim 3 wherein said friction elements comprise a disc clutch associated between a pair of lockable differential gears.

6. Apparatus according to claim 3 wherein the friction elements comprise a disc clutch for a gearwheel selectively lockable on a shaft.

* * * * *